US009158186B2

(12) United States Patent
Gishi et al.

(10) Patent No.: US 9,158,186 B2
(45) Date of Patent: Oct. 13, 2015

(54) PROJECTION DISPLAY DEVICE (75) Inventors: Hiromitsu Gishi, Higashiosaka (JP); Taichi Yoshimura, Osaka (JP); Kouji Shiraito, Amagasaki (JP); Jaehyun Lee, Daito (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 316 days.

(21) Appl. No.: 13/104,382

(22) Filed: May 10, 2011

(65) Prior Publication Data
US 2011/0279789 A1 Nov. 17, 2011

(30) Foreign Application Priority Data
May 17, 2010 (JP) ................................. 2010-112835

(51) Int. Cl.
*G03B 21/18* (2006.01)
*G03B 21/16* (2006.01)
*H04N 9/31* (2006.01)

(52) U.S. Cl.
CPC .............. *G03B 21/16* (2013.01); *H04N 9/3144* (2013.01)

(58) Field of Classification Search
CPC ...... G03B 21/16; G03B 21/26; H04N 9/3197; H04N 9/3105
USPC .............. 353/57–61, 66; 362/373; 415/121.2; 454/184
See application file for complete search history.

(56) References Cited

U.S. PATENT DOCUMENTS

| 5,622,419 | A | * | 4/1997 | Holder et al. | 353/119 |
|---|---|---|---|---|---|
| 5,676,442 | A | * | 10/1997 | Fujimori | 353/119 |
| 7,052,144 | B2 | * | 5/2006 | Nakamura | 353/61 |
| 7,901,092 | B2 | * | 3/2011 | Adachi et al. | 353/119 |
| 2003/0137640 | A1 | | 7/2003 | Nakano et al. | |
| 2004/0218151 | A1 | | 11/2004 | Ito et al. | |
| 2005/0094106 | A1 | | 5/2005 | Nakamura | |
| 2008/0218706 | A1 | * | 9/2008 | Adachi et al. | 353/98 |
| 2008/0252859 | A1 | * | 10/2008 | Nagahata et al. | 353/61 |

FOREIGN PATENT DOCUMENTS

| CN | 101261358 A | | 9/2008 | |
| JP | 2002-365728 | * | 12/2001 | ............. G03B 21/16 |
| JP | 2002-365728 A | | 12/2002 | |

(Continued)

OTHER PUBLICATIONS

Translation of 2008-291815.*

(Continued)

*Primary Examiner* — William C Dowling
*Assistant Examiner* — Jerry Brooks
(74) *Attorney, Agent, or Firm* — Westerman, Hattori, Daniels & Adrian, LLP (57) ABSTRACT

A projection display device is provided with a main body cabinet; a projection port which is formed in the main body cabinet to guide modulated light to an outside of the projection display device; an air outlet which is formed at least in one of two surfaces of the main body cabinet facing each other across the projection port; and an exhaust unit which discharges, to the outside, air that has been warmed by heat exchange with a member to be cooled which is disposed in the main body cabinet through the air outlet. In this arrangement, the exhaust unit includes an exhaust fan, and a deflection member which deflects air discharged from the exhaust fan in a direction away from the projection plane.

11 Claims, 11 Drawing Sheets

(56) References Cited

FOREIGN PATENT DOCUMENTS

| | | | |
|---|---|---|---|
| JP | 2004-77883 A | 3/2004 | |
| JP | 2006-343565 A | 12/2006 | |
| JP | 2008-262062 A | 10/2008 | |
| JP | 2008-291815 * | 12/2008 | ............. G03B 21/16 |
| JP | 2009-181113 A | 8/2009 | |
| JP | 2012-150516 A | 8/2012 | |

OTHER PUBLICATIONS

Machine Translation of Japanese Application 2008-291815, Nov. 7, 2014.*

Chinese Office Action dated Nov. 5, 2013, issued in corresponding Chinese Patent Application No. 201110128505.2 with English translation (12 pages).

Chinese Office Action dated May 6, 2013, issued in corresponding Chinese Patent Application No. 201110128505.2 (7 pages).

* cited by examiner

PROJECTION DISPLAY DEVICE

This application claims priority under 35 U.S.C. Section 119 of Japanese Patent Application No. 2010-112835 filed May 17, 2010, entitled "PROJECTION DISPLAY DEVICE". The disclosure of the above application is incorporated herein by reference.

BACKGROUND OF THE INVENTION

1. Field of the Invention

The present invention relates to a projection display device for modulating light from a light source by an imager, and enlarging and projecting the modulated light onto a projection plane.

2. Disclosure of Related Art

Conventionally, a projection display device (hereinafter, called as a "projector") such as a liquid crystal projector is configured such that light (hereinafter, called as "image light") modulated by an imager such as a liquid crystal panel is projected onto a projection plane by a projection lens. In such a projector, heat is generated in e.g. a light source, an imager, and a power source unit. In view of this, it is required to cool these heat generating members.

In such a projector, there may be used an arrangement that air drawn from the outside of the projector is supplied to the heat generating members, and air that has been warmed by heat exchange with the heat generating members is discharged to the outside of the projector to thereby cool the heat generating members. In this case, for instance, an exhaust fan is disposed in a main body cabinet, and air sucked by the exhaust fan is discharged to the outside of the projector through an air outlet formed in the main body cabinet.

The air outlet of the main body cabinet may be formed in various surfaces (upper and lower surfaces, left and right surfaces, and front and rear surfaces) of the main body cabinet in positional relation to components such as a light source and an imager.

In recent years, a so-called short focus projector operable to project an image onto a projection plane (such as a screen) with a shorter distance has been commercialized. In such a projector, the divergence angle of image light is relatively large. Further, air discharged through the air outlet spreads to some extent as it propagates. As a result, the discharged air may overlap with image light, depending on the position of the air outlet. Since the discharged air has a relatively high temperature, if such a high-temperature air overlaps with image light, an image projected onto the projection plane may become obscure.

SUMMARY OF THE INVENTION

A main aspect of the invention is directed to a projection display device which modulates light from a light source and projects the modulated light onto a projection plane. The projection display device according to the main aspect is provided with a main body cabinet; a projection port which is formed in the main body cabinet to guide the modulated light to an outside of the projection display device; an air outlet which is formed at least in one of two surfaces of the main body cabinet facing each other across the projection port; and an exhaust unit which discharges, to the outside, air that has been warmed by heat exchange with a member to be cooled which is disposed in the main body cabinet through the air outlet. In this arrangement, the exhaust unit includes an exhaust fan, and a deflection member which deflects air discharged from the exhaust fan in a direction away from the projection plane.

BRIEF DESCRIPTION OF THE DRAWINGS

These and other objects, and novel features of the present invention will become more apparent upon reading the following detailed description of the embodiment along with the accompanying drawings.

The drawings are provided mainly for describing the present invention, and do not limit the scope of the present invention.

DESCRIPTION OF PREFERRED EMBODIMENTS

In the following, an embodiment of the invention is described referring to the drawings.

In the embodiment, a first air outlet 9 and a second air outlet 10 correspond to an "air outlet" in the claims. A lamp unit 14 corresponds to a "light source" in the claims. A projection lens unit 171 corresponds to a "projection lens section" in the claims. A reflection mirror 172 corresponds to a "mirror section" in the claims. A first exhaust unit 21 and a second exhaust unit 22 correspond to an "exhaust unit" in the claims. A first exhaust fan 300 and a second exhaust fan 600 correspond to an "exhaust fan" in the claims. A first fan cover 400 and a second fan cover 700 correspond to a "deflection member" in the claims. A light blocking cover 500 corresponds to a "light blocking member" in the claims. The description regarding the correspondence between the claims and the embodiment is merely an example, and the claims are not limited by the description of the embodiment.

Figure 1A:
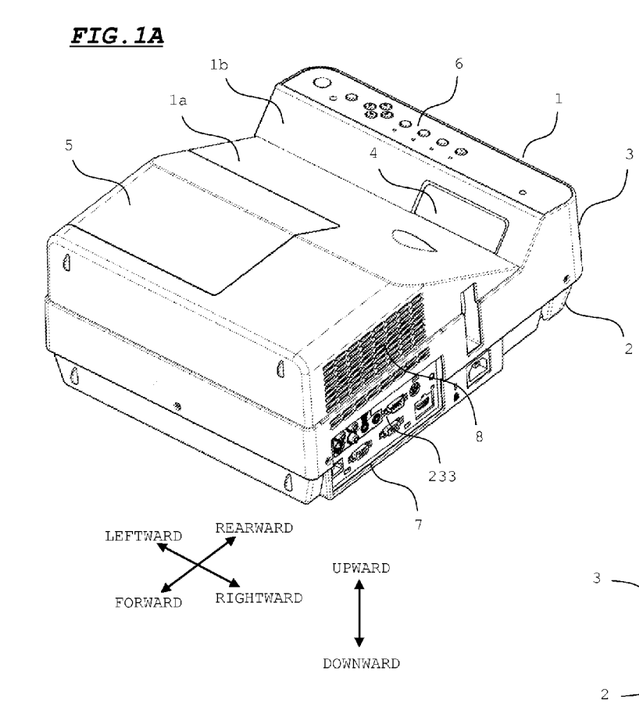
FIGS. 1A and 1B are diagrams (perspective views) showing an external construction of a projector embodying the invention.
Figure 1B:
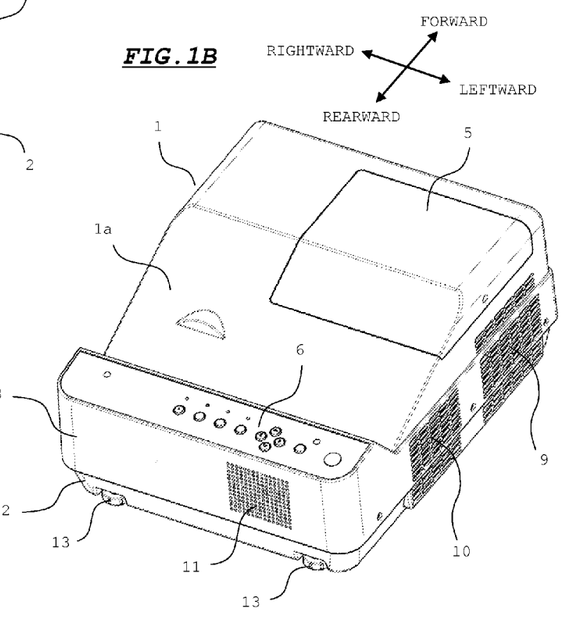
Figure 2:
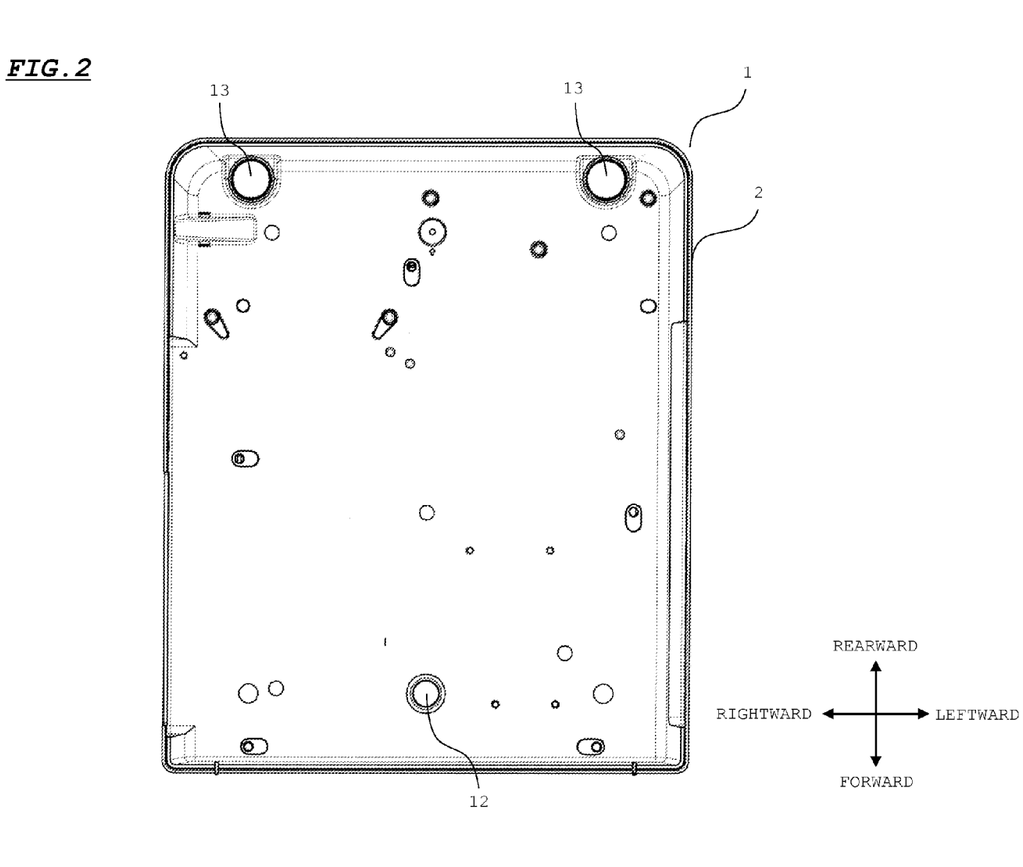
FIG. 2 is a diagram (bottom view) showing an external construction of the projector as the embodiment.

FIGS. 1A, 1B and FIG. 2 are diagrams showing an external construction of a projector embodying the invention. FIG. 1A is a perspective view of the projector when viewed from a front side, and FIG. 1B is a perspective view of the projector when viewed from a rear side. FIG. 2 is a bottom view of the projector. To simplify the description, arrows respectively indicating forward, rearward, leftward, and rightward directions, and arrows each indicating upward and downward directions are depicted in FIGS. 1A, 1B and FIG. 2. Hereinafter, the arrows indicating forward, rearward, leftward, and rightward directions are depicted in the same manner as above in the other drawings, as necessary.

The projector of the embodiment is a so-called short focus projector. Referring to FIGS. 1A and 1B, the projector is provided with a main body cabinet 1 having a substantially rectangular parallelepiped shape. The main body cabinet 1 is constituted of a lower cabinet 2, and an upper cabinet 3 which is placed on the lower cabinet 2 from above.

A top surface of the main body cabinet 1 is formed with a first slope 1a inclined downward and rearward, and a second slope 1a continuing from the first slope 1a and inclined upward and rearward. The second slope 1b faces obliquely upward and forward, and a projection port 4 is formed in the second slope 1b. Image light emitted obliquely upward and forward through the projection port 4 is enlarged and projected onto a screen disposed in front of the projector.

Further, the top surface of the main body cabinet 1 is formed with a lamp cover 5. The top surface of the main body cabinet 1 is formed with a lamp opening for use in exchanging a lamp unit, and a filter opening for use in exchanging a filter disposed in a fan unit for cooling the lamp unit. The lamp cover 5 is a cover for covering the lamp opening and the filter opening. Further, the top surface of the main body cabinet 1 is provided with an operation portion 6 constituted of a plurality of operation keys.

A terminal port portion 7 is formed in a right surface of the main body cabinet 1. A terminal panel 233 having various terminals such as AV terminals is attached to the terminal port portion 7. The terminal panel 233 constitutes a part of a control circuit unit to be described later. Audio Visual (AV) signals such as an image signal and an audio signal are inputted and outputted to and from the projector through the AV terminals. Further, an air inlet 8 is formed in the right surface of the main body cabinet 1 at a position above the terminal port portion 7. The air inlet 8 is constituted of multitudes of slit holes, and external air is drawn into the main body cabinet 1 through the air inlet 8.

A first air outlet 9 is formed in a front portion on a left surface of the main body cabinet 1, and a second air outlet 10 is formed in a middle portion on the left surface of the main body cabinet 1. Each of the first and second air outlets 9, 10 is constituted of multitudes of slit holes, and air inside the main body cabinet 1 is discharged to the outside of the projector through the first and second air outlets 9, 10. Further, a sound output port 11 is formed in a rear surface of the main body cabinet 1. Sounds in accordance with images are outputted through the sound output port 11 at the time of image projection.

Referring to FIG. 2, a fixed leg 12 is disposed in the middle of a front portion on a bottom surface of the main body cabinet 1, and two adjustable legs 13 are disposed at a rear end thereof. By expanding or contracting the two adjustable legs 13 up and down, it is possible to adjust the inclination of the main body cabinet 1 in forward/rearward directions and leftward/rightward directions. Thus, it is possible to adjust the upward/downward position and the leftward/rightward inclination of an image projected on a screen.

The projector of the embodiment may be installed in a suspended state from a ceiling with the main body cabinet 1 being upside down, other than an installation manner that the bottom surface of the main body cabinet 1 is placed on an installation plane such as a desk surface or a floor surface. Further, a front surface of the main body cabinet 1 is a flat surface without the terminal panel 233 and the air inlet 8. Accordingly, it is possible to install the projector of the embodiment in such a manner that the front surface of the main body cabinet 1 is placed on an installation plane. In this case, an image is projected on the installation plane itself.

Figure 3:
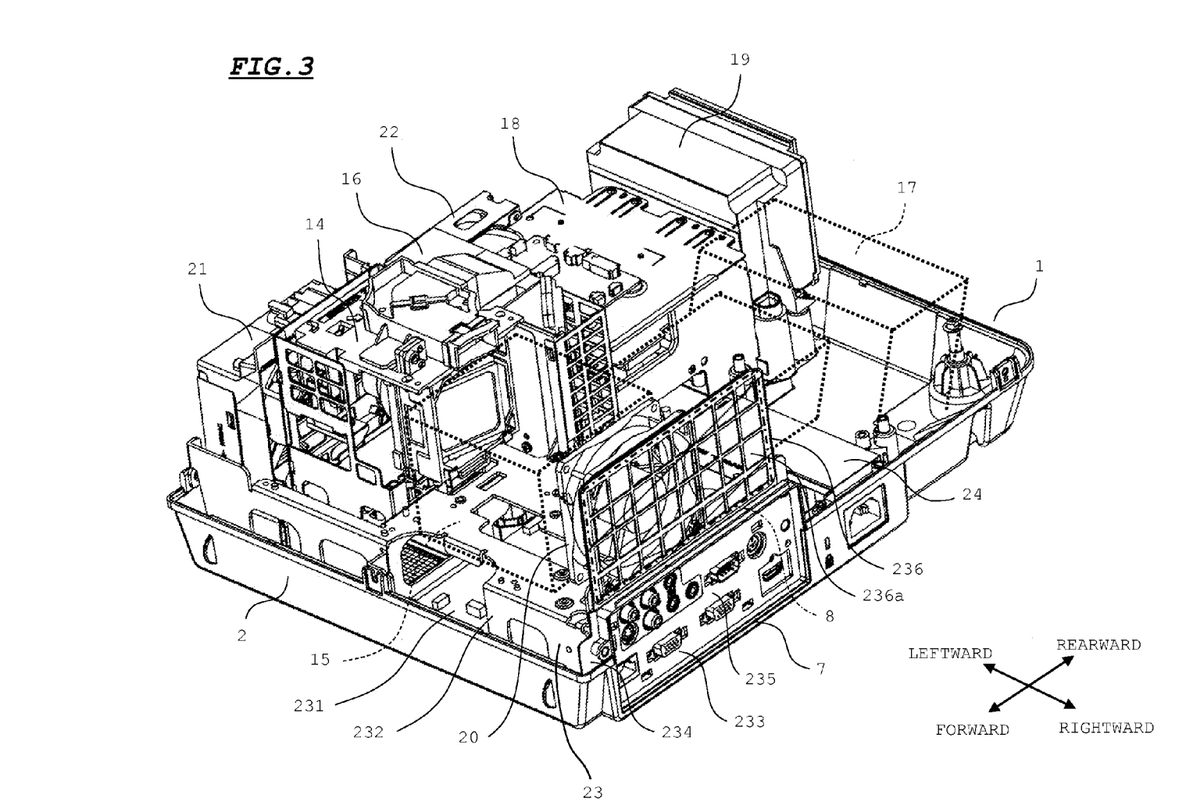
FIG. 3 is a diagram showing an internal structure of the projector as the embodiment.

FIG. 3 is a diagram showing an internal structure of the projector. FIG. 3 is a perspective view showing a state that the upper cabinet 3 is detached, when viewed from a front side. To simplify the description, in FIG. 3, an imager unit 15 and a projection optical unit 17 are indicated by the dotted lines. Further, the position of the air inlet 8 is indicated by the one-dotted chain line.

Referring to FIG. 3, a lamp unit 14, and the imager unit 15 for modulating light from the lamp unit 14 to generate image light are disposed on a front portion of the lower cabinet 2.

The lamp unit 14 is constituted of a light source lamp, and a lamp holder for holding the light source lamp; and is configured so as to be detachably attached from above. A fan unit 16 is disposed behind the lamp unit 14. The fan unit 16 supplies external air (cooling air) drawn through the air inlet 8 to the light source lamp to cool the light source lamp. The lamp holder is formed with an air duct for guiding the cooling air from the fan unit 16 to the light source lamp.

The imager unit 15 includes a color wheel and a Digital Micromiror Device (DMD). The color wheel separates white light from the light source lamp into light of respective colors such as red, green, blue in a time-sharing manner. The DMD modulates the light of the respective colors emitted from the color wheel based on an image signal.

The projection optical unit 17 is disposed at a rear position of the imager unit 15. The projection optical unit 17 enlarges image light generated by the imager unit 15, and projects the enlarged image light onto a projection plane such as a screen.

Figure 4:
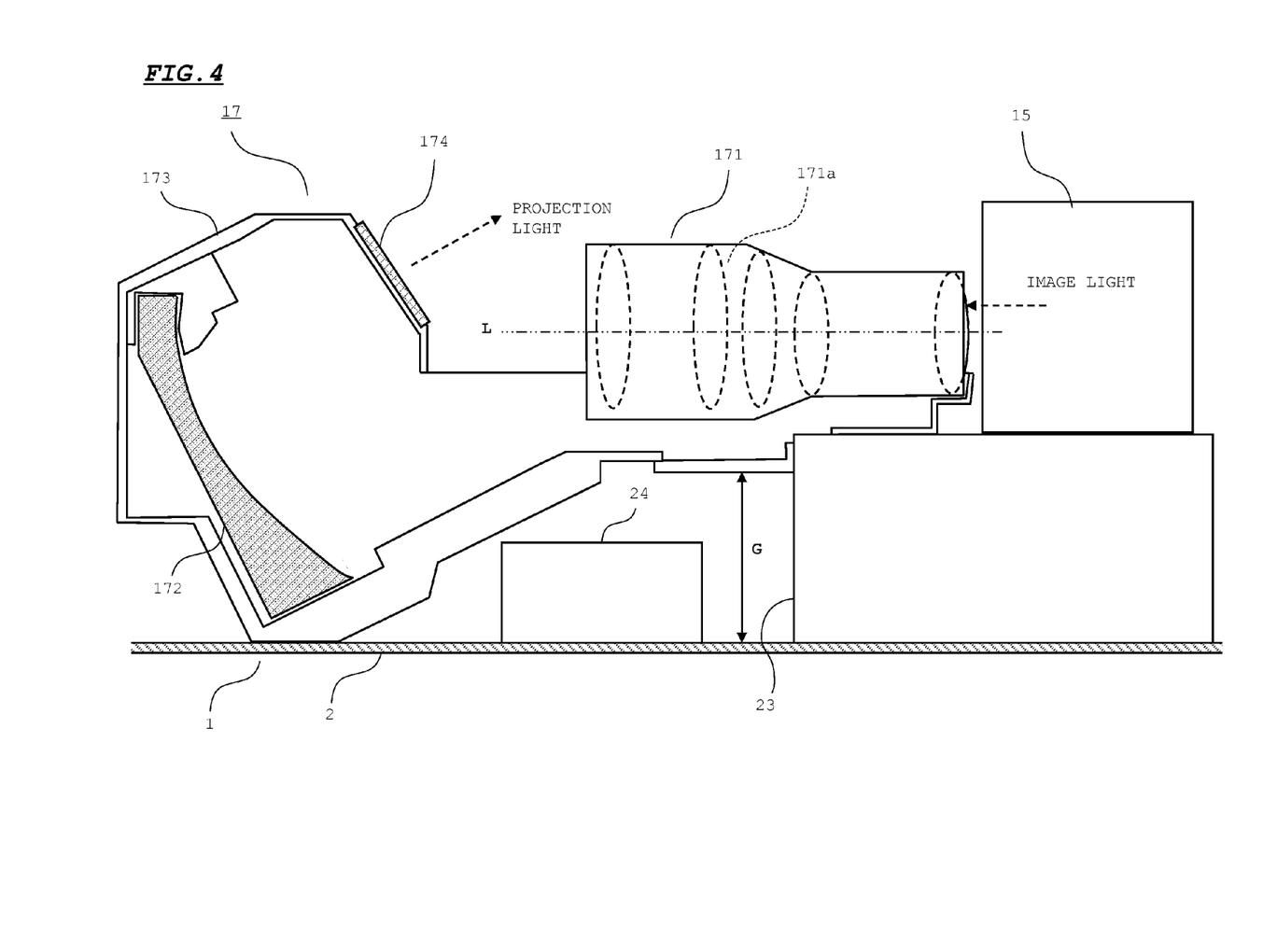
FIG. 4 is a diagram schematically showing an arrangement of a projection optical unit in the embodiment.

FIG. 4 is a diagram schematically showing an arrangement of the projection optical unit 17. In FIG. 4, the imager unit 15, a control circuit unit 23, and a noise filter unit 24 are schematically shown, in addition to the projection optical unit 17.

The projection optical unit 17 is constituted of a projection lens unit 171, a reflection mirror 172, and a housing 173 for housing the projection lens unit 171 and the reflection mirror 172. The projection lens unit 171 has a plurality of lenses 171a. The reflection mirror 172 is a curved mirror or a free curved mirror.

As shown in FIG. 4, image light emitted from the imager unit 15 is entered into the projection lens unit 171 at a position shifted from the optical axis L of the projection lens unit 171 in a direction toward the top surface of the main body cabinet 1. The entered image light receives a lens action by the projection lens unit 171, and is entered into the reflection mirror 172. Thereafter, the projection angle of the image light is expanded by the reflection mirror 172, and the image light is projected onto a projection plane (screen) via a light ray passage window 174.

As described above, image light is entered into the projection lens unit 171 at a position shifted from the optical axis L of the projection lens unit 171 in a direction toward the top surface of the main body cabinet 1. In view of this, the reflection mirror 172 is disposed at a position shifted from the optical axis L of the projection lens unit 171 toward the bottom surface of the main body cabinet 1. Here, the reflection mirror 172 has a reflection surface larger than the lens surface of each lens 171a constituting the projection lens unit 171. Accordingly, the shift amount of the reflection mirror 172 with respect to the optical axis L of the projection lens unit 171 is relatively large. Consequently, there is defined a relatively large space G between a lower surface of the projection lens unit 171 and the bottom surface of the main body cabinet 1 (lower cabinet 2). The space G is defined from the position where the projection lens unit 171 is disposed to the position where the imager unit 15 is disposed.

Referring back to FIG. 3, a power source unit 18 is disposed behind the fan unit 16. The power source unit 18 is provided with a power source circuit to supply electric power to each electric component of the projector. A speaker 19 is disposed behind the power source unit 18. Sounds outputted through the speaker 19 are released to the outside through the sound output port 11.

A DMD cooling fan 20 is disposed on the right of the imager 15. The DMD cooling fan 20 supplies external air drawn through the air inlet 8 to the imager unit 15 so as to cool the DMD. The DMD is sealably disposed in the imager unit 15, so that the DMD is kept from being directly contacted with the supplied external air.

A first exhaust unit 21 is disposed on the left of the lamp unit 14. The first exhaust unit 21 discharges air that has cooled the light source lamp to the outside through the first air outlet 9. The first exhaust unit 21 also discharges air that has cooled the DMD to the outside through the first air outlet 9.

A second exhaust unit 22 is disposed on the left of the power source unit 18. The second exhaust unit 22 discharges air that has been warmed in the inside of the power source unit 18 to the outside through the second air outlet 10. By flowing air from the inside of the power source unit 18 to the second exhaust unit 22, fresh external air is supplied into the power source unit 18 through the air inlet 8.

As shown in FIG. 3 and FIG. 4, in the projector of the embodiment, the control circuit unit 23 and the noise filter unit 24 are disposed in the space G defined below the projection lens unit 171 and the imager unit 15.

The noise filter unit 24 is provided with a circuit board mounted with a noise filter and a fuse thereon, and supplies electric power inputted from a commercial AC power source to the power source unit 18 after noise removal.

The control circuit unit 23 includes a control circuit board 231, a holder 232 for holding the control circuit board 231, the terminal panel 233, and a fixing board 234 for fixing the terminal panel 233.

A control circuit for controlling various driving components such as a light source lamp and a DMD is mounted on the control circuit board 231. Further, various terminals 235 are mounted on the control circuit board 231.

The terminal panel 233 is formed with various openings of the shapes in accordance with the shapes of the terminals 235. The terminals 235 are exposed to the outside through the openings. Although not illustrated, the fixing board 234 is formed with openings through which the terminals 235 pass, as well as the terminal panel 233.

The fixing board 234 is made of a metal material, and a shielding portion 236 is formed on an upper portion thereof. The shielding portion 236 is formed with multitudes of openings 236a, and a metal mesh (not shown) is attached to each of the openings 236a. The shielding portion 236 is disposed on the inside of the air inlet 8 to block electromagnetic wave from leaking to the outside through the air inlet 8. External air drawn through the air inlet 8 is supplied to the inside of the main body cabinet 1 through the openings 236a.

Next, an arrangement of the first exhaust unit 21 and the second exhaust unit 22 is described in detail referring to FIGS. 5A to 9.

Figure 5A:
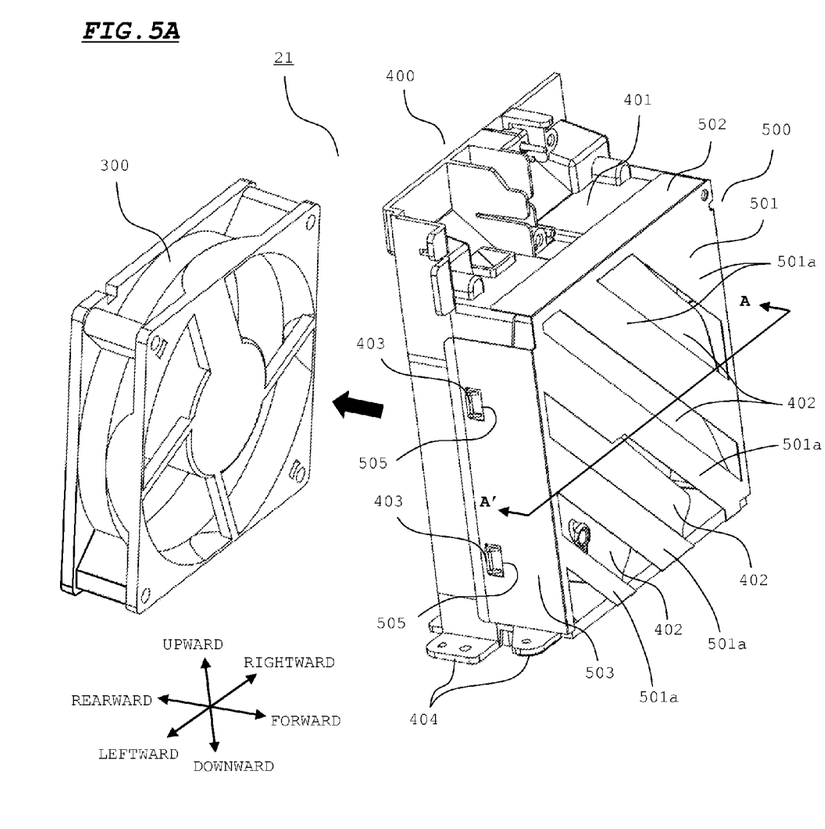
FIGS. 5A and 5B are diagrams showing an arrangement of a first exhaust unit in the embodiment.
Figure 5B:
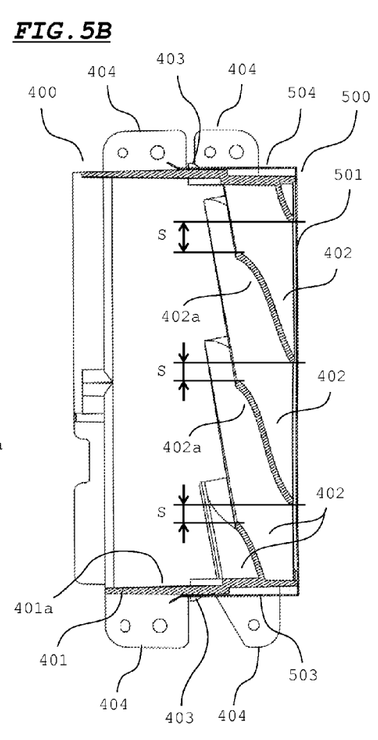
Figure 6A:
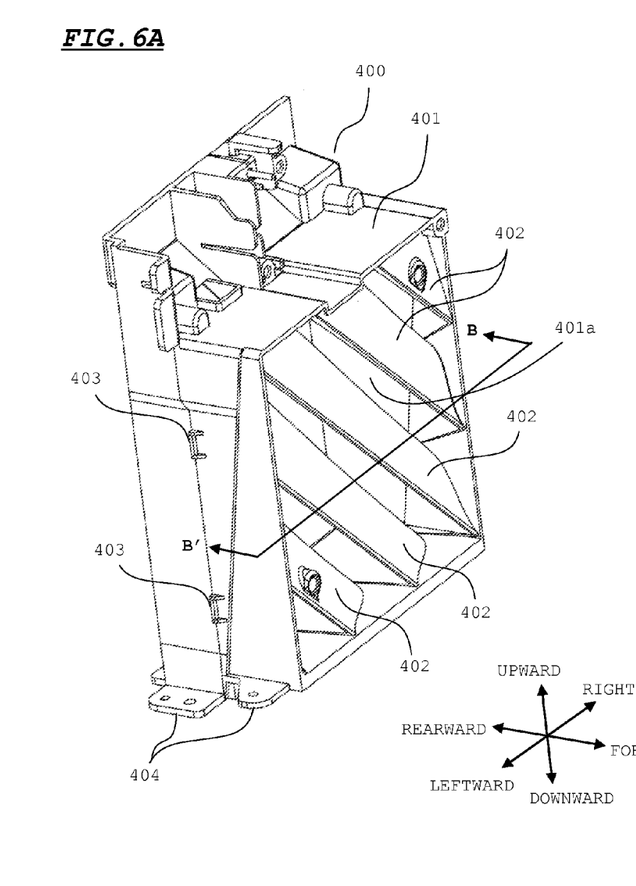
FIGS. 6A and 6B are diagrams showing an arrangement of a first fan cover in the embodiment.
Figure 6B:
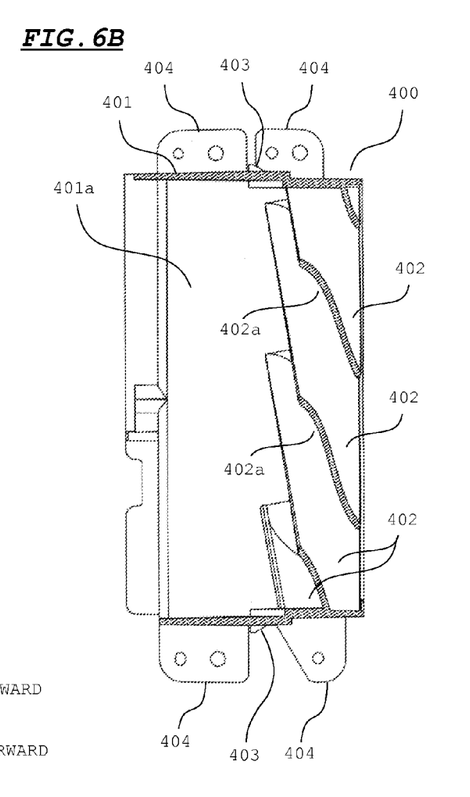

FIGS. 5A and 5B are diagrams showing an arrangement of the first exhaust unit 21. FIG. 5A is a perspective view showing a state before a first fan cover 400 attached with a light blocking cover 500 is mounted on a first exhaust fan 300. FIG. 5B is a cross-sectional view taken along the line A-A' in FIG. 5A. FIGS. 6A and 6B are diagrams showing an arrangement of the first fan cover 400. FIG. 6A is a perspective view of the first fan cover 400, and FIG. 6B is a cross-sectional view taken along the line B-B' in FIG. 6A.

Figure 7A:
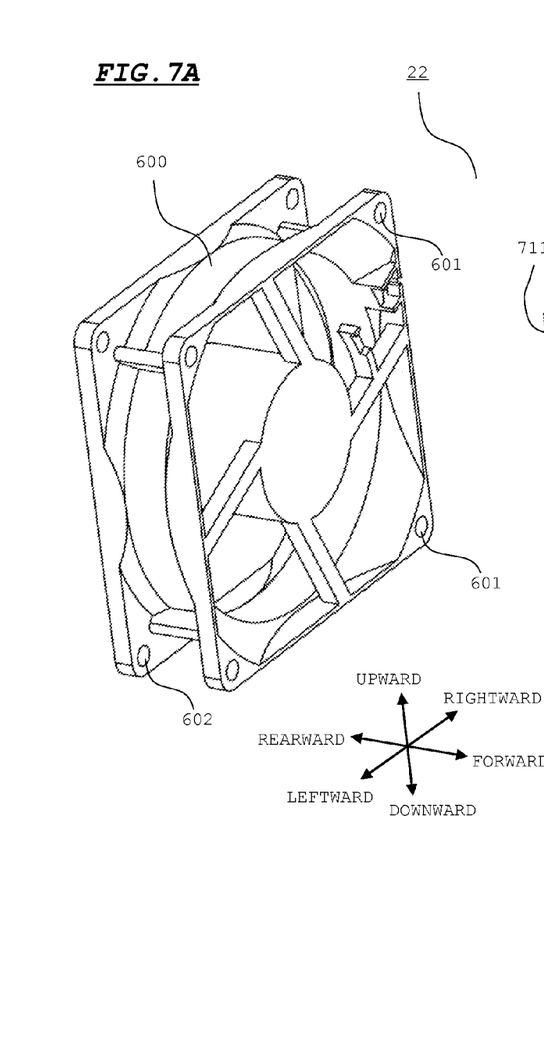
FIGS. 7A and 7B are diagrams showing an arrangement of a second exhaust unit in the embodiment.
Figure 7B:
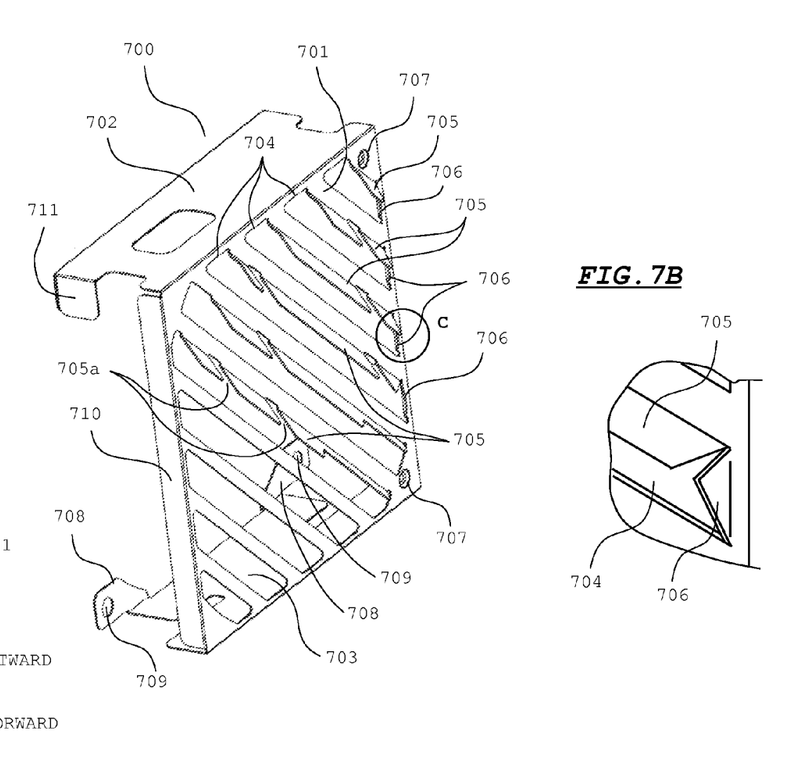

FIGS. 7A and 7B are diagrams showing an arrangement of the second exhaust unit 22. FIG. 7A is a perspective view showing a state before the second fan cover 700 is mounted on a second exhaust fan 600. FIG. 7B is an enlarged view of essential parts of a portion C in FIG. 7A when viewed from obliquely rightward in forward direction.

Figure 8:
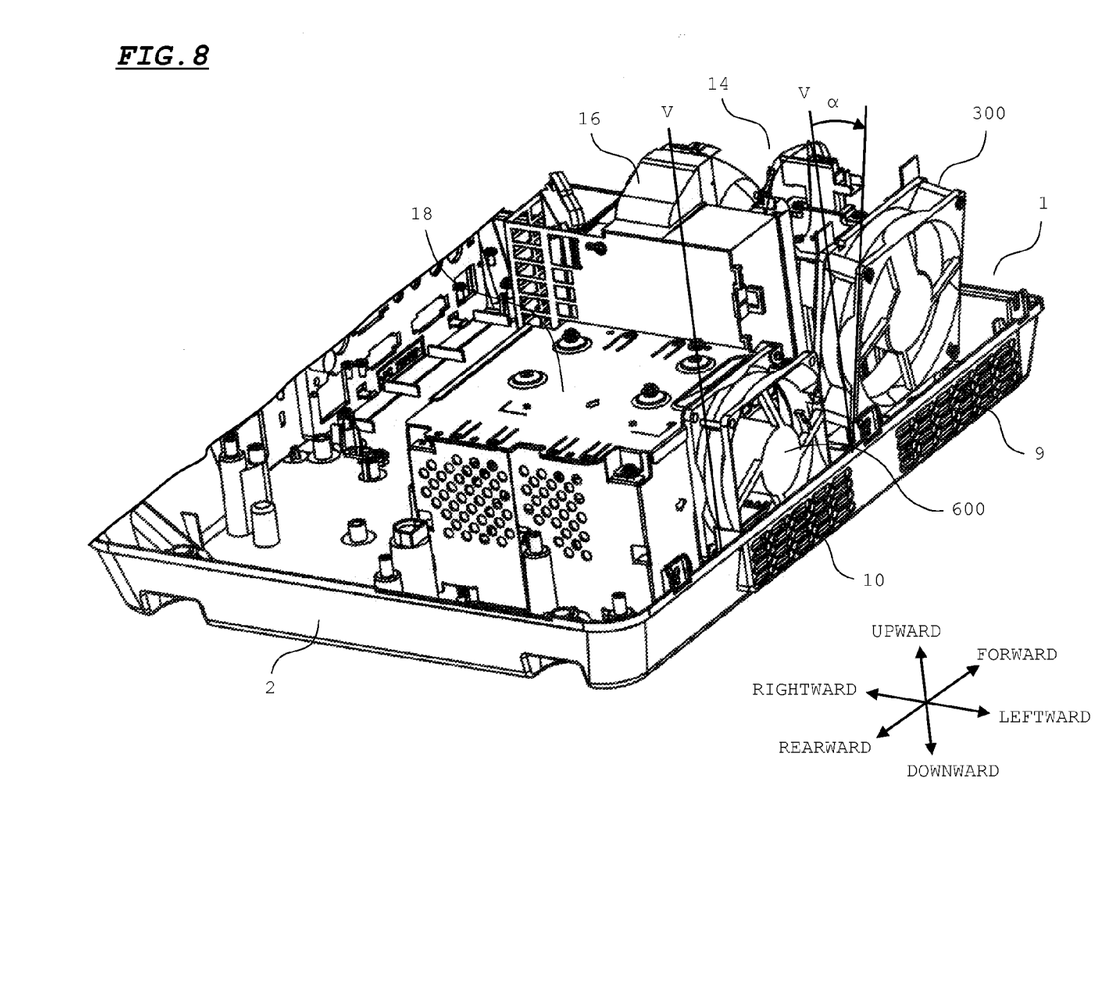
FIG. 8 is a diagram showing a state that the first exhaust fan and the second exhaust fan in the embodiment are disposed in a main body cabinet, with respective fan covers thereof being detached.
Figure 9:
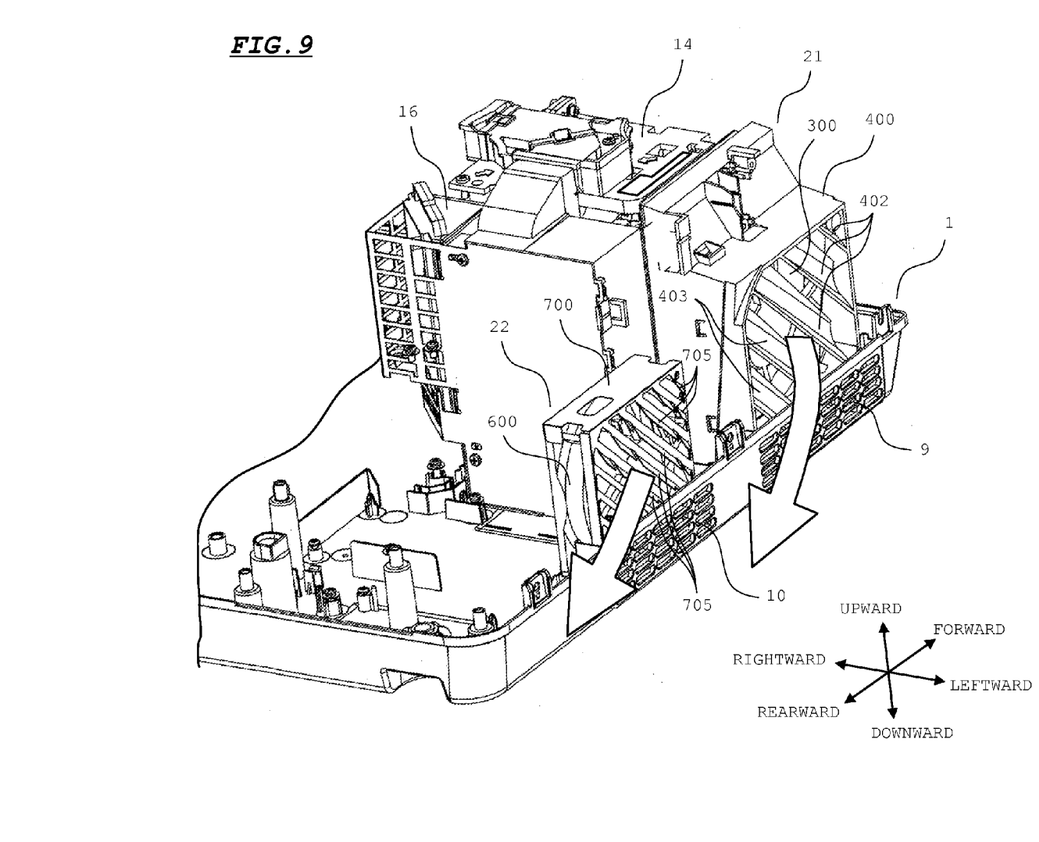
FIG. 9 is a diagram showing a state that the first exhaust fan and the second exhaust fan in the embodiment are disposed in the main body cabinet, with respective fan covers thereof being attached.

FIG. 8 is a perspective view of essential parts showing a state that the first exhaust fan 300 and the second exhaust fan 600 are disposed in the main body cabinet 1, with the fan covers 400, 700 being detached from the first and second exhaust fans 300, 600, respectively. FIG. 9 is a perspective view of essential parts showing a state that the first exhaust fan 300 and the second exhaust fan 600 are disposed in the main body cabinet 1, with the fan covers 400, 700 being attached onto the first and second exhaust fans 300, 600, respectively. In FIG. 8 and FIG. 9, only the components necessary for description are shown. Further, in FIG. 9, the light blocking cover 500 for the first exhaust unit 21 is not shown.

Firstly, an arrangement of the first exhaust unit 21 is described.

As shown in FIGS. 5A and 5B, the first exhaust unit 21 is constituted of the first exhaust fan 300, the first fan cover 400 for covering the first exhaust fan 300, and the light blocking cover 500 to be attached to the first fan cover 400.

The first exhaust fan 300 is an axial stream fan, and sucks air from a rear side thereof and discharges the air forward. As shown in FIG. 8, the first exhaust fan 300 is mounted on a bottom surface of the main body cabinet 1 with a small angle (inclination angle $\alpha$) toward the left surface of the main body cabinet 1 with respect to an axis V perpendicular to the bottom surface of the main body cabinet 1. With this arrangement, an exhaust surface of the first exhaust fan 300 is directed slightly toward the bottom surface of the main body cabinet 1 with respect to a direction in parallel to the bottom surface.

As shown in FIGS. 6A and 6B, the first fan cover 400 is provided with a frame body 401 having a substantially rectangular opening. A rear portion of the frame body 401 is formed with a housing portion 401a for housing the first exhaust fan 300 therein. As described above, since the first exhaust fan 300 is disposed with an inclination, the housing portion 401a is configured to be expanded toward an upper portion thereof.

A front portion of the frame body 401 is formed with a louver constituted of a plurality of louver portions 402 aligned with a predetermined interval. Each louver portion 402 extends obliquely from lower right to upper left in FIG. 6A, and is inclined such that a front side of each louver portion 402 is set low and a rear side thereof is set high. With this arrangement, a back surface 402a (hereinafter, the back surface is called as a "deflection surface 402a") of each louver portion 402 is directed to a left rear direction and an obliquely downward direction in FIG. 6A. Further, as shown in FIG. 6B, the deflection surface 402a of each louver portion 402 is formed into a concave curved surface.

A tab portion 403 is formed at two positions on each of left and right surfaces of the frame body 401. Further, two attachment portions 404 are formed at each of left and right lower ends of the frame body 401.

As shown in FIGS. 5A and 5B, the light blocking cover 500 is constituted of a substantially rectangular front plate 501, an upper plate 502 formed at an upper end of the front plate 501, and a left plate 503 and a right plate 504 respectively formed at a left end and a right end of the front plate 501. The light blocking cover 500 is made of a metal material.

The first fan cover 400 is made of a resin material. When the first fan cover 400 is manufactured by molding, as shown in FIG. 5B, clearances S are formed between the respective adjacent louver portions 402 when viewed from a front side. The front plate 501 is formed with obliquely extending light blocking portions 501a in such a manner as to cover the clearances S, and a portion of the front plate 501 other than the light blocking portions 501a is opened to pass air therethrough.

The first exhaust unit 21 is disposed adjacent to the lamp unit 14. With this arrangement, light that has leaked from a light source lamp 142 may attempt to leak outside through the clearances S formed between the respective adjacent louver portions 402. However, since the space in front of the clearances S is blocked by the light blocking portions 501a, light leakage through the clearances S is prevented.

When the light blocking cover 500 is mounted on the first fan cover 400, the upper plate 502 is contacted with the upper surface of the first fan cover 400, and the left plate 503 and the right plate 504 are contacted with left and right surfaces of the first fan cover 400. At the contact, the two tab portions 403 formed on the left side of the first fan cover 400 are engaged in two engaging holes 505 formed in the left plate 503, and the two tab portions 403 formed on the right side of the first fan cover 400 are engaged in two engaging holes 505 formed in the right plate 504. With this engagement, there is no likelihood that the light blocking cover 500 may be disengaged in forward direction.

The first fan cover 400 attached with the light blocking cover 500 is mounted on the first exhaust fan 300 disposed in the main body cabinet 1 from a front side. Further, the first fan cover 400 is fixed to the bottom surface of the main body cabinet 1 (see FIG. 9) by screw-fastening the attachment portions 404 to bosses (not shown) formed in the bottom surface of the main body cabinet 1.

Next, an arrangement of the second exhaust unit 22 is described.

As shown in FIG. 7A, the second exhaust unit 22 is constituted of the second exhaust fan 600, and the second fan cover 700 for covering the second exhaust fan 600.

The second exhaust fan 600 is an axial stream fan, and sucks air from a rear side thereof and discharges the air forward. As shown in FIG. 8, the second exhaust fan 600 is mounted on the bottom surface of the main body cabinet 1 in a direction in parallel to the axis V perpendicular to the bottom surface of the main body cabinet 1. With this arrangement, an exhaust surface of the second exhaust fan 600 is directed in a direction in parallel to the bottom surface of the main body cabinet 1.

The second fan cover 700 is constituted of a substantially rectangular front plate 701, and an upper plate 702 and a lower plate 703 respectively formed on an upper end and a lower end of the front plate 701. The second fan cover 700 is made of a metal material.

The front plate 701 is formed with a plurality of obliquely-extending slit-like openings 704 formed at a predetermined interval. The front plate 701 is further formed with a louver constituted of a plurality of louver portions 705 aligned with a predetermined interval. Each louver portion 705 obliquely extends from lower right to upper left in FIG. 7A along an upper edge of the corresponding opening 704, and is inclined such that a front side of each louver portion 705 is set low and a rear side thereof is set high. With this arrangement, a back surface (hereinafter, this back surface is called as a "deflection surface") of each louver portion 705 is directed to a left rear direction and an obliquely downward direction in FIG. 7A.

A plurality of deflection plates 706 are formed at right edges of the respective openings 704 on a left end of the front plate 701. As shown in FIG. 7B, each of the deflection plates 706 has a substantially triangular shape, and extends obliquely leftward in forward direction. Air that has been discharged from the second exhaust fan 600 and is about to pass the vicinities of the right edges of the respective openings 704 impinges on the deflection plates 706.

The front plate 701 is further formed with an attachment hole 707 in each of upper and lower corners on the right side thereof. Further, the lower plate 703 is formed with an attachment piece 708 formed with an attachment hole 709 on left and right sides at a rear end thereof.

The second fan cover 700 is mounted on the second exhaust fan 600 by sliding the second fan cover 700 from the left side of the second exhaust fan 600 in rightward direction. A left end of the front plate 701, and a left end of the upper plate 702 are respectively formed with contact pieces 710, 711; and sliding the second fan cover 700 to a proper position brings the contact pieces 710, 711 into contact with a left surface of the second exhaust fan 600.

When the second fan cover 700 is completely mounted, the two attachment holes 707 of the front plate 701 are aligned with attachment holes 601 formed in the upper right corner and the lower right corner on the front side of the second exhaust fan 600. Further, the attachment holes 709 formed in the two attachment pieces 708 are aligned with attachment holes 602 formed in the lower left corner and the lower right corner on the rear side of the second exhaust fan 600. By screw-fastening between the attachment holes 707 and the attachment holes 601, and between the attachment holes 709 and the attachment holes 602, the second fan cover 700 is fixedly mounted on the second exhaust fan 600 (see FIG. 9).

In this embodiment, a plurality of reinforcing ribs (not shown) are formed on the inner surface of the main body cabinet 1, and cutaways 705a are formed in the corresponding louver portions 705 of the second fan cover 700 to avoid the reinforcing ribs. Alternatively, it is possible to form the louver portions 705 without the cutaways 705a by disposing reinforcing ribs at such a position as to avoid the position where the second exhaust unit 22 is disposed.

Figure 10:
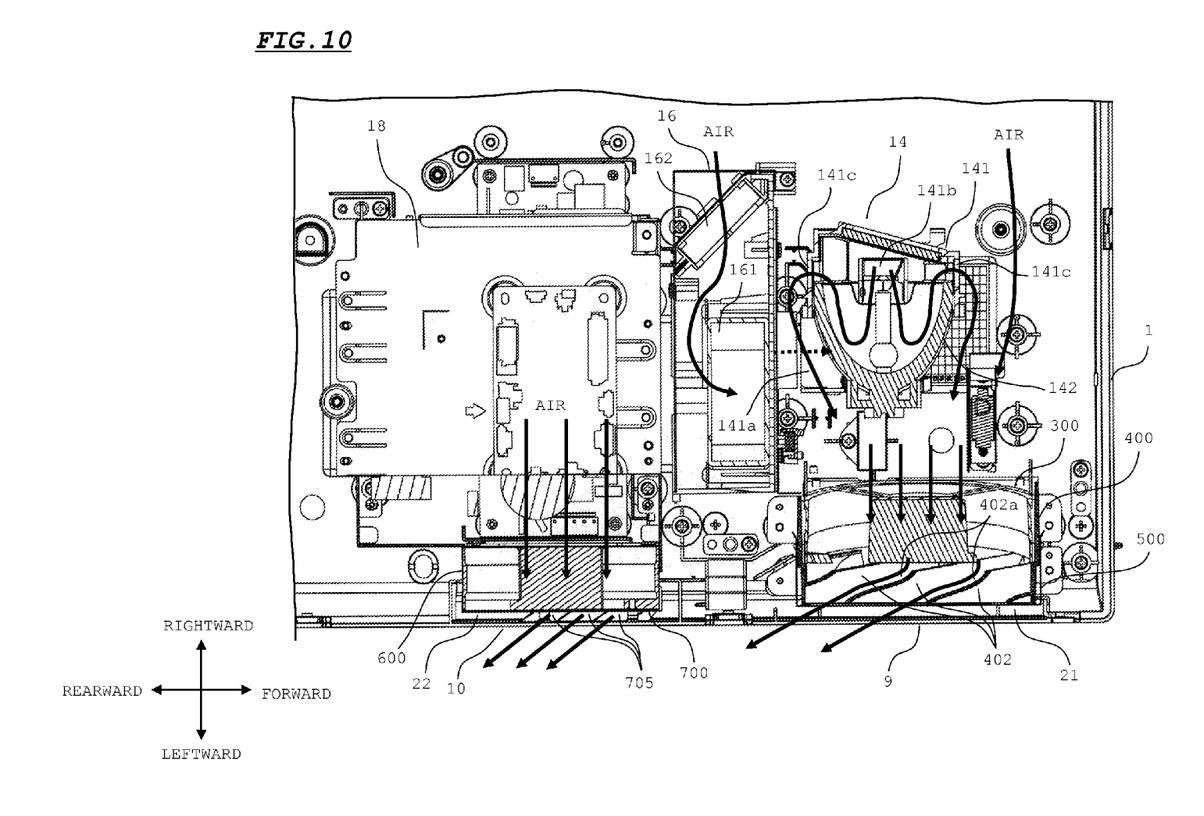
FIG. 10 is a diagram for describing streams of air to be discharged from the main body cabinet in the embodiment.

FIG. 10 is a diagram for describing streams of air to be discharged from the main body cabinet 1. In FIG. 10, the lamp unit 14, the fan unit 16, the first exhaust unit 21, and the second exhaust unit 22 are shown in cross section to simplify the description. Further, the streams of air are shown by the arrows.

When the projector is run, and the fan unit 16, the DMD cooling fan 20, the first exhaust unit 21, and the second exhaust unit 22 are driven, external air is drawn to the inside of the main body cabinet 1 through the air inlet 8.

As shown in FIG. 10, the fan unit 16 is provided with a lamp cooling fan 161 and a filter 162, and air drawn to the inside of the main body cabinet 1 is sucked by the lamp cooling fan 161 through the filter 162. At the air suction, dust and the like contained in the air are removed by the filter 162. Air fed from the lamp cooling fan 161 passes through a duct 141a formed in a lamp holder 141 of the lamp unit 14, and is blown out to the inside of a reflector of the light source lamp 142 through an outlet 141b to cool the light source lamp 142 from the inside thereof. Air that has been warmed by heat exchange with the light source lamp 142 is discharged from the lamp unit 14 through a discharge port 141c.

Air discharged from the lamp unit 14 is sucked by the first exhaust fan 300. Further, air that has been warmed by cooling the DMD flows from the side of the imager unit 15 to the side of the first exhaust unit 21, and is sucked by the first exhaust fan 300.

Air discharged from the first exhaust fan 300 passes the louver formed on the first fan cover 400. Specifically, discharged air has its direction changed when impinged on the deflection surface 402a of each louver portion 402, and is discharged from the louver along the deflection surfaces 402a. Thus, the air discharged from the first exhaust unit 21 is discharged rearward and downward of the main body cabinet 1 through the first air outlet 9, as shown by the hollow arrow in FIG. 9.

At the discharge, since the deflection surfaces 402a are formed into a concave curved surface, the air smoothly changes its direction along the concave curved surfaces. Thus, the air is smoothly discharged from the first exhaust unit 21. Further, since the first exhaust fan 300 is disposed with an exhaust surface thereof being inclined downward, as compared with a case that the first exhaust fan 300 is disposed upright, the above arrangement is advantageous in discharging air further downward from the first exhaust unit 21.

Next, air that has been warmed by heat exchange with the power source unit 18 is sucked by the second exhaust fan 600. Air discharged from the second exhaust fan 600 passes the louver formed on the second fan cover 700. Specifically, discharged air has its direction changed when impinged on the deflection surface of each louver portion 705, and is discharged from the louver along the deflection surfaces. Thus, the air discharged from the second exhaust unit 22 is discharged rearward and downward of the main body cabinet 1 through the second air outlet 10, as shown by the hollow arrow in FIG. 9.

Here, as described referring to FIG. 7B, the second fan cover 700 is formed with the deflection plates 706 at a right end thereof, in other words, at an end corresponding to a forward side of the main body cabinet 1. Accordingly, the air passing along the right end of the second fan cover 700 has its direction also changed toward a rear side of the main body cabinet 1 by the deflection plates 706.

Figure 11:
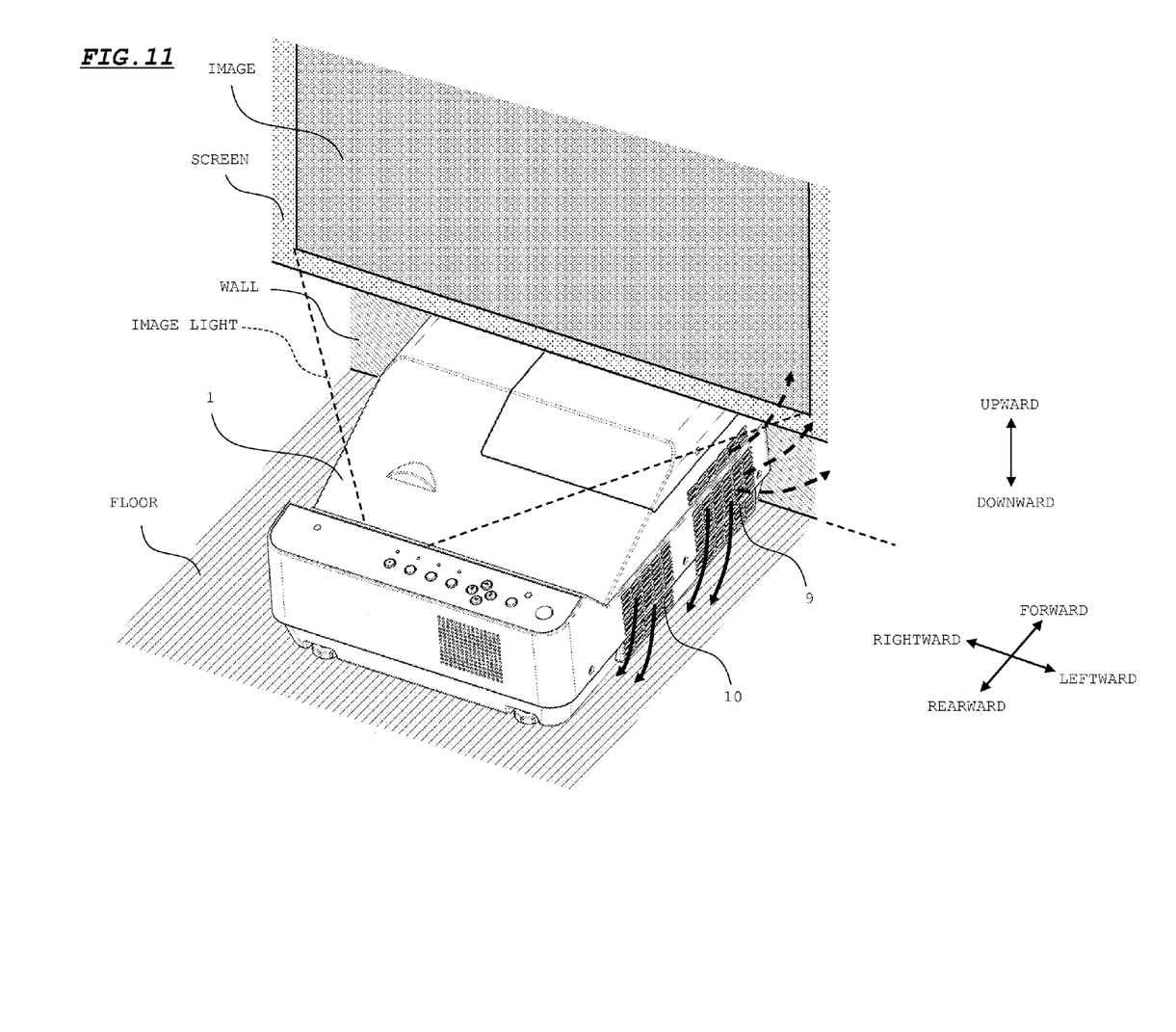
FIG. 11 is a diagram for describing a projection manner and an advantage of the projector in the embodiment.

FIG. 11 is a diagram showing a projection manner by the embodiment. The projector of the embodiment is operable to project an image onto a screen in a state that the projector is disposed close to the screen to such an extent that the front surface of the main body cabinet 1 is abutted against a wall.

Air discharged through the first air outlet 9 and the second air outlet 10 spreads to some extent as it propagates. Accordingly, when air is discharged leftward through the first air outlet 9 and the second air outlet 10, as shown by the broken-line arrows in FIG. 11, a part of the discharged air may overlap with image light. Since the air discharged from the main body cabinet 1 has a relatively high temperature, if such a high-temperature air overlaps with image light, an image may become obscure, and the image quality may be degraded.

Further, in the embodiment, the DMD is sealably disposed in the imager unit 15, so that the DMD is kept from being directly contacted with the supplied external air. Since there is no need of removing dust and the like from air for cooling the DMD, the filter 162 is provided only for the fan unit 16, and a filter is not provided in the air inlet 8 of the main body cabinet 1. With this arrangement, if air containing dust and the like discharged through the first air outlet 9 and the second air outlet 10 may impinge against a screen or a wall, the screen or the wall may be smeared with dust and the like.

In the embodiment, however, as shown by the solid-line arrows in FIG. 11, since air is discharged through the first air outlet 9 and the second air outlet 10 in such a direction as to be away from a screen, it is possible to prevent discharged air from overlapping with image light. This enables to prevent formation of an obscure image and smear of a screen.

In particular, in this embodiment, the louver portions 402 of the first fan cover 400 and the louver portions 705 of the second fan cover 700 are formed to extend obliquely, and air is discharged through the first air outlet 9 and the second air outlet 10 rearward and downward of the projector. Specifically, air is discharged in such a direction as to be away from a screen in both of a direction (forward and rearward directions) perpendicular to the screen and a direction (upward and downward directions) in parallel to the screen. Thus, the arrangement is more advantageous in preventing discharged air from overlapping with image light, and in preventing discharged air from impinging against a screen or a wall.

Further, in this embodiment, since the first exhaust fan 300 is disposed with an exhaust surface thereof being inclined downward, this arrangement is advantageous in discharging air further downward through the first air outlet 9. Thus, this arrangement is more advantageous in preventing discharged air from overlapping with image light, and in preventing discharged air from impinging against a screen or a wall.

Furthermore, in this embodiment, since the projection port 4 is disposed at a position displaced in a direction (rightward direction in FIG. 11) away from the first air outlet 9 and the second air outlet 10 with respect to a middle position of the left and right surfaces of the main body cabinet 1, a projection area of image light is shifted rightward from a transversely center position of the projector. With this arrangement, there is no or less likelihood that air discharged through the first air outlet 9 and the second air outlet 10 may overlap with image light.

The embodiment of the invention has been described as above. The invention is not limited to the foregoing embodiment. Further, the embodiment of the invention may be changed or modified in various ways other than the above, as necessary, as far as such changes and modifications do not depart from the scope of the claims of the invention hereinafter defined.

For instance, in this embodiment, the projector is configured such that air is discharged rearward and downward of the projector. Alternatively, the projector may be configured such that air is discharged in only one of rearward and downward directions. In the case where air is discharged rearward, the louver portions 402 (705) of the louver are formed to extend in a direction perpendicular to the bottom surface of the main body cabinet 1. Further, in the case where air is discharged downward, the louver portions 402 (705) of the louver are formed to extend in a direction in parallel to the bottom surface of the main body cabinet 1. However, since an installation plane is normally located beneath the projector, the installation plane may obstruct discharge of air. In view of this, in the case where the projector is configured to discharge air only in one direction, it is desirable to configure the projector such that air is discharged rearward.

Further, in the embodiment, the first air outlet 9 and the second air outlet 10 are formed in the left surface of the main body cabinet 1. Alternatively, the first air outlet 9 and the second air outlet 10 may be formed in the right surface or the bottom surface of the main body cabinet 1.

Furthermore, in the embodiment, a DMD is used as an imager constituting the imager unit 15. Alternatively, a liquid crystal panel may be used.

In addition, in the embodiment, the lamp unit 14 having a light source lamp is used. Alternatively, a light source other than the lamp light source, such as a laser light source or an LED light source may be used.

The embodiment of the invention may be changed or modified in various ways as necessary, as far as such changes and modifications do not depart from the scope of the claims of the invention.

What is claimed is:

1. A projection display device comprising:
   a main body cabinet;
   a projection port which is formed on a top surface of the main body cabinet to guide, to an outside of the projection display device, image light reflected on a reflection mirror;
   a projection optical unit which reflects image light, generated by modulating light from a light source and projected from a projection lens unit, on the reflection mirror to project the image light through the projection port onto a projection plane, the projection plane being arranged diagonally forward above the main body cabinet;
   an air outlet which is formed at least in one of right and left side surfaces of the main body cabinet, the air outlet being arranged in a position anterior to the projection port; and
   an exhaust unit which discharges, to the outside, air that has been warmed by heat exchange with a member to be cooled which is disposed in the main body cabinet through the air outlet, wherein
   the exhaust unit includes
   an exhaust fan, and
   a deflection member which orients, downward and backward from the main body cabinet, air discharged from the exhaust fan.

2. The projection display device according to claim 1, wherein
   the deflection member has a louver structure configured such that a plurality of louver portions are aligned with a predetermined interval, and
   each of the louver portions includes a deflection surface inclined toward a direction in which the air is discharged from the exhaust fan, the discharged air being oriented when impinged on the deflection surface and discharged downward and backward from the main body cabinet.

3. The projection display device according to claim 2, wherein
   the deflection surface of the louver portion is formed into a concave curved surface.

4. The projection display device according to claim 2, wherein
   the exhaust fan is disposed adjacent to the light source, and
   the exhaust unit further includes a light blocking member which blocks light from the light source from leaking through a space between adjacent louver portions toward the air outlet,
   the light blocking member is disposed forward of the deflection member and includes a light blocking portion which covers the space, and
   a portion of the light blocking member other than the light blocking portion is opened to pass air therethrough.

5. The projection display device according to claim 1, wherein
   the exhaust fan is inclined with respect to the main body cabinet in such a manner that the air discharged from the exhaust fan is away, from the image light emitted through the projection port, in a direction in parallel to the projection plane.

6. The projection display device according to claim 1, wherein
   the air outlet is formed in only one of the right and left side surfaces of the main body cabinet, and
   the projection port is disposed at a position displaced in a direction away from the air outlet with respect to a middle position of the right and left side surfaces of the main body cabinet.

7. The projection display device according to claim 1, wherein
   the deflection member orients the air discharged from the exhaust fan in such a direction as to be away from the image light emitted through the projection port in a direction in parallel to the projection plane.

8. The projection display device according to claim 7, wherein
   the deflection member has a louver structure configured such that a plurality of louver portions are aligned with a predetermined interval, and
   each of the louver portions includes a deflection surface inclined toward a direction in which the air is discharged from the exhaust fan, the discharged air being deflected oriented when impinged on the deflection surface and discharged downward and backward from the main body cabinet.

9. The projection display device according to claim 8, wherein
   the deflection surface of the louver portion is formed into a concave curved surface.

10. The projection display device according to claim 8, wherein
    the exhaust fan is disposed adjacent to the light source, and
    the exhaust unit further includes a light blocking member which blocks light from the light source from leaking through a space between adjacent louver portions toward the air outlet,
    the light blocking member is disposed forward of the deflection member and includes a light blocking portion which covers the space, and
    a portion of the light blocking member other than the light blocking portion is opened to pass air therethrough.

11. The projection display device according to claim 7, wherein
    the exhaust fan is inclined with respect to the main body cabinet in such a manner that the air discharged from the exhaust fan is away, from the image light emitted through the projection port, in a direction in parallel to the projection plane.

* * * * *